US009304502B2

(12) United States Patent
Grossmann et al.

(10) Patent No.: US 9,304,502 B2
(45) Date of Patent: Apr. 5, 2016

(54) METHOD AND DEVICE FOR CALIBRATING A POSITIONER SYSTEM HAVING AN ELECTRONICALLY COMMUTATED SERVOMOTOR

(75) Inventors: Alex Grossmann, Leonberg (DE); Udo Sieber, Bietigheim (DE); Ralf Buehrle, Hochberg (DE); Zeynep Tosun, Istanbul (TR)

(73) Assignee: Robert Bosch GmbH, Stuttgart (DE)

( * ) Notice: Subject to any disclaimer, the term of this patent is extended or adjusted under 35 U.S.C. 154(b) by 334 days.

(21) Appl. No.: 14/005,145

(22) PCT Filed: Jan. 10, 2012

(86) PCT No.: PCT/EP2012/050279
§ 371 (c)(1),
(2), (4) Date: Feb. 24, 2014

(87) PCT Pub. No.: WO2012/123133
PCT Pub. Date: Sep. 20, 2012

(65) Prior Publication Data
US 2014/0152229 A1 Jun. 5, 2014

(30) Foreign Application Priority Data
Mar. 15, 2011 (DE) .......... 10 2011 005 566

(51) Int. Cl.
G05B 11/01 (2006.01)
G05B 13/02 (2006.01)
(Continued)

(52) U.S. Cl.
CPC .......... *G05B 13/0265* (2013.01); *F02D 11/106* (2013.01); *F02D 41/2438* (2013.01); *F02D 41/2464* (2013.01); *G05B 6/02* (2013.01); *F02D 2200/0404* (2013.01)

(58) Field of Classification Search
USPC ................ 318/560, 671, 520, 554, 555, 1.75; 73/114.36; 123/399, 361; 324/202, 324/207.2, 207.13, 106
See application file for complete search history.

(56) References Cited

U.S. PATENT DOCUMENTS 5,157,956 A * 10/1992 Isaji .................... B60K 28/16
  73/1.75
5,606,950 A   3/1997 Fujiwara et al.
(Continued)

FOREIGN PATENT DOCUMENTS

CN    1150503 A    5/1997
CN  101034841 A    9/2007
(Continued)

OTHER PUBLICATIONS

International Search Report corresponding to PCT Application No. PCT/EP2012/050279, mailed Apr. 12, 2012 (German and English language document) (5 pages).

*Primary Examiner* — Shawki S Ismail
*Assistant Examiner* — Jorge L Carrasquillo
(74) *Attorney, Agent, or Firm* — Maginot, Moore & Beck LLP

(57) ABSTRACT

A method for calibrating a positioner system that has an electronically commutated servomotor and a counterforce-loaded actuator coupled thereto includes actuating the servomotor such that a first motor magnetic field of a first strength is generated and determining a first position specification for the position of the actuator aligned to the first motor magnetic field. The servomotor is actuated such that a second motor magnetic field of a second strength is generated and a second position specification for the position of the actuator aligned to the second motor magnetic field is determined. Based on the first and the second position specifications, a position specification which indicates a position of the actuator under the assumption that the actuator is not loaded with a counterforce is determined. The determined position is allocated to a rotor position which corresponds to the direction of the first and second motor magnetic field.

9 Claims, 3 Drawing Sheets

(51) Int. Cl.
 *F02D 11/10* (2006.01)
 *F02D 41/24* (2006.01)
 *G05B 6/02* (2006.01)

(56) References Cited

U.S. PATENT DOCUMENTS

| | | |
|---|---|---|
| 2001/0019252 A1 | 9/2001 | Watanbe |
| 2003/0210004 A1 | 11/2003 | Zacher et al. |
| 2004/0042150 A1* | 3/2004 | Swinbanks ............... B63G 9/06 361/144 |
| 2004/0244772 A1* | 12/2004 | Ikeda ...................... F02D 11/10 123/399 |
| 2007/0272206 A1* | 11/2007 | Ikeda ...................... F02D 9/105 123/339.14 |
| 2010/0219817 A1* | 9/2010 | Galka ...................... G01B 7/30 324/207.25 |
| 2011/0115477 A1* | 5/2011 | Suzuki ................... G01D 5/145 324/207.21 |

FOREIGN PATENT DOCUMENTS

| | | |
|---|---|---|
| DE | 43 07 337 A1 | 9/1994 |
| DE | 199 44 809 A1 | 3/2001 |
| DE | 100 65 488 A1 | 7/2001 |
| EP | 1 338 775 A2 | 8/2003 |

* cited by examiner

METHOD AND DEVICE FOR CALIBRATING A POSITIONER SYSTEM HAVING AN ELECTRONICALLY COMMUTATED SERVOMOTOR

This application is a 35 U.S.C. § 371 National Stage Application of PCT/EP2012/050279, filed on Jan. 10, 2012, which claims the benefit of priority to Serial No. DE 10 2011 005 566.5, filed on Mar. 15, 2011 in Germany, the disclosures of which are incorporated herein by reference in their entirety.

BACKGROUND

The disclosure relates to positioner systems having electronically commutated servomotors, wherein a position of an actuator that is to be positioned can be indicated by means of a position detector.

Numerous positioners are used in a motor vehicle. The positioners generally comprise an electrically motorized servomotor, a transmission or a mechanism and an actuator, the position of which actuator can be positioned by means of the servomotor and by way of the transmission. By way of example, positioners of this type can be used as throttle positioners, as an exhaust gas recirculation valve, for charge motion control valves and numerous comparable components.

Depending upon the field of application, positioners of this type are frequently provided with a position detector for indicating the actual position of the actuator. A position detector of this type can be used on the one hand to check the correct position of the actuator. As a consequence, it is possible to monitor that the controlled position of the positioner also corresponds to the actual position of the actuator. On the other hand, it is possible to control the position of the actuator with the aid of the actual position that is detected by means of the position detector, in that the measured actual position is controlled in comparison to the predetermined set position.

Brush commutated electric motors are generally used as servomotors for positioners of this type. However, said electric motors are encumbered by the disadvantage that their EMC behavior is impaired as a result of the development of brush sparking. Furthermore, said electric motors have a higher energy consumption owing to the friction of the brushes on a commutator and said electric motors have a reduced serviceable life owing to the wear on the brushes.

These disadvantages do not apply to electronically commutated electric motors that are used as servomotors. However, electronically commutated servomotors do require an external commutation, for which it is necessary to know the rotor position in order to ensure optimum commutation. The usual methods for ascertaining the rotor position use additional rotor position sensors in the electric motor, which sensors increase the overall production costs of the servomotor. In addition, the cost of providing cabling between the servomotor and the corresponding control device increases.

Methods that do not use sensors and are based for example on measuring the voltage that is induced in the stator winding, for example the back EMF method, also require a costly circuitry in the control device and are generally too expensive for positioners. Alternative methods that do not use sensors and wherein the rotor position is ascertained by means of measuring the rotor position of the dependent inductivity of the stator coils likewise require a costly circuitry in the control device and are in addition not as robust and as reliable as the methods that use sensors in order to measure the rotor position.

Positioner systems are known wherein the position detector that is arranged on the actuator or on the transmission that controls the actuator is used directly for commutating the brushless electric motor. The position variable that is provided by the position detector is converted into a rotor position in order to be able to use it during the commutation process.

When controlling the electronically commutated servomotor, the best level of efficiency with respect to torque is achieved when the motor magnetic field is advanced by 90° (electric rotor position) with respect to the exciter magnetic field, which exciter magnetic field is generated by the rotor of the servomotor. However, different influences, for example aging influences on the position detector, which have a drifting effect, and loss of accuracy owing to a reduction gear that couples the actuator to the servomotor, and its tolerances result in a reduced level of accuracy of the rotor position that is ascertained from the position variable. This can lead to the commutation of the servomotor being performed on the basis of an erroneous rotor position, so that only a reduced torque is available for the positioning process.

Since it is generally not certain that the position variable that has been ascertained by the position detector is allocated to the actual rotor position during the commissioning of the positioner system, it is necessary to perform a calibration process. A calibration process of this type can be performed for example by means of controlling the servomotor with the aid of commutation patterns in the controlled operation, said commutation patterns produce a defined direction of the motor magnetic field. In the controlled operation, the exciter magnetic field of the rotor is to be aligned with the motor magnetic field, so that the rotor position corresponds to the direction of the motor magnetic field. It is possible to allocate a position of the actuator to the rotor position that is ascertained in this manner.

Counter forces that are generally not constant take effect as the actuator is moved during the calibration process, said counter forces can be for example a result of friction or the like or also as a result of a restoring force that influences the actuator. These counter forces hamper the calibration process since they can cause an initially unknown deviation of the rotor position with respect to an actuator that is not influenced by counter forces.

It is therefore the object of the present disclosure to provide a method and a device for calibrating a positioner system whilst using an external position detector for the commutation process, which method compensates for the influence of non-constant counter forces on the actuator and/or the rotor.

SUMMARY

This object is achieved by virtue of the method for calibrating a positioner system in accordance with the disclosure and by virtue of the device and the positioner system in accordance with the disclosure.

Further advantageous embodiments of the present disclosure are disclosed in the dependent claims.

In accordance with a first aspect, a method for calibrating a positioner system is provided, wherein the positioner system comprises an electronically commutated servomotor and an actuator that is influenced by a counter force and is coupled to said servomotor, wherein a position of the actuator is detected in order to obtain a position variable, and wherein a commutation of the servomotor is performed in order to generate a motor magnetic field based on a rotor position that is ascertained with the aid of the position variable, said method comprising the following steps of:

controlling the servomotor so that a first motor magnetic field of a first magnitude is generated, and ascertaining a first position variable for the position of the actuator that is aligned with the first motor magnetic field;

controlling the servomotor so that a second motor magnetic field of a second magnitude is generated, and ascertaining a second position variable for the position of the actuator that is aligned with the second motor magnetic field, wherein the directions of the first and the second motor magnetic field are identical;

based on the first and the second position variable, ascertaining a position variable that indicates a position of the actuator under the assumption that the actuator is not influenced by a counter force;

allocating the ascertained position variable to a rotor position that corresponds with the position of the direction of the first and second motor magnetic field.

One idea of the above-mentioned method is to calibrate one or several rotor positions of an actuator of the positioner system, in that at least two different magnitudes of motor magnetic fields are generated for a direction of a motor magnetic field and corresponding position variables are ascertained by way of the position of the actuator. Under the assumption of a linear dependency of the counter force with respect to a deviation of the position of the actuator from the position in the case of an actuator that is not influenced by a counter force, it is possible, based on the position variables in the case of a specific direction of the motor magnetic field, to ascertain the position variable by way of the position of the actuator that is not influenced by a counter force. This ascertained position variable can be allocated to the direction of the motor magnetic field that corresponds to the direction of the exciter magnetic field in the case of an actuator that is not influenced by a counter force. As a consequence, it is possible to calibrate the rotor position to a position variable by means of controlling the actuator twice with motor magnetic fields of the same direction and different magnitudes and the influences of the counter forces can be eliminated during the calibration process.

Furthermore, the position variable that indicates a position of the actuator under the assumption that the actuator is not influenced by a counter force can be ascertained by means of extrapolation, in particular by means of linear extrapolation, of the first and the second position variable.

In accordance with one embodiment, the extrapolation can be performed at a point where the magnitude of the motor magnetic field corresponds to zero or almost zero.

In particular, the servomotor can be controlled with the aid of phase voltages, wherein the magnitude of the motor magnetic field is ascertained by means of a duty cycle of phase voltages that are applied to the servomotor and/or wherein the direction of the motor magnetic field is ascertained by means of the ratio of the phase voltages.

In accordance with a further aspect, a device for calibrating a positioner system is provided, wherein the positioner system comprises an electronically commutated servomotor and an actuator that is influenced by a counter force and is coupled to said servomotor, wherein a position of the actuator is detected in order to obtain a position variable, and wherein a commutation of the servomotor is performed in order to generate a motor magnetic field based on a rotor position that is ascertained with the aid of the position variable, wherein the device is embodied in order:

to control the servomotor so that a first motor magnetic field of a first magnitude is generated, and to ascertain a first position variable for the position of the actuator that is aligned with the first motor magnetic field;

to control the servomotor so that a second motor magnetic field of a second magnitude is generated, and to ascertain a second position variable for the position of the actuator that is aligned with the second motor magnetic field, wherein the directions of the first and the second motor magnetic field are identical;

based on the first and the second position variable to ascertain a position variable that indicates a position of the actuator under the assumption that the actuator is not influenced by a counter force;

to allocate the ascertained position variable to a rotor position that corresponds with the position of the direction of the first and second motor magnetic field.

In accordance with a further aspect, a positioner system is provided that comprises:

an electronically commutated servomotor;

an actuator that is influenced by a counter force and is coupled to the servomotor;

a position detector in order to detect a position of the actuator and to provide a position variable that indicates the position of the actuator, a control device for implementing a commutation of the servomotor in order to generate a motor magnetic field based on the rotor position that is ascertained with the aid of the position variable;

a device for calibrating the positioner system, wherein the device causes the control device:

to control the servomotor in such a manner that a first motor magnetic field of a first magnitude is generated, and to ascertain a first position variable for the position of the actuator that is aligned with the first motor magnetic field;

to control the servomotor in such a manner that a second motor magnetic field of a second magnitude is generated, and to ascertain a second position variable for the position of the actuator that is aligned with the second motor magnetic field, wherein the directions of the first and the second motor magnetic field are identical;

and wherein the device is embodied in order:

based on the first and the second position variable to ascertain a position variable that indicates a position of the actuator under the assumption that the actuator is not influenced by a counter force;

to allocate the ascertained position variable to a rotor position that corresponds with the position of the direction of the first and second motor magnetic field.

In accordance with a further aspect, a computer program product is provided that comprises a program code that performs the above-mentioned method if it is implemented on a data processing unit.

BRIEF DESCRIPTION OF THE DRAWINGS

Preferred embodiments of the present disclosure are explained in detail hereinunder with reference to the attached drawings, in which.

DETAILED DESCRIPTION

Figure 1:
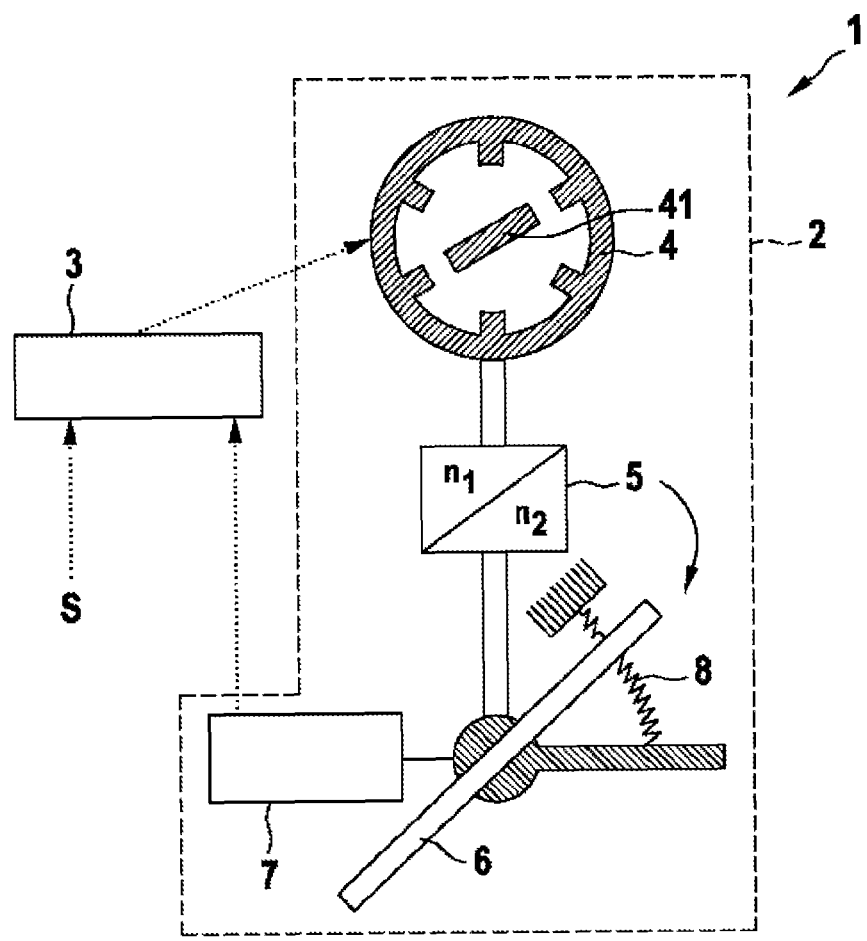
FIG. 1 illustrates a schematic representation of a positioner system, wherein an external position detector is used for the commutation of the servomotor.

FIG. 1 illustrates a positioner system 1 having a positioner 2 that is controlled by a control device 3. The positioner 2 comprises as a servomotor 4 an electronically commutated, i.e. brushless electric motor, for example a synchronous motor, an asynchronous motor or the like. The servomotor 4 comprises a driven shaft that is coupled to a transmission 5. The transmission 5 is coupled in turn to an actuator 6. The actuator 6 is to be moved and/or positioned by means of the control device 3 into a predefined position. The control device comprises for this purpose a position parameter S, for example a driver-requested torque in time in the case of a throttle valve actuator.

The transmission 5 is embodied in particular as a reduction gear 5, so that a smaller positioning travel of the actuator 6 is allocated to a rotor travel. A coupling mechanism can also be provided as an alternative to the transmission 5.

A position detector 7 is arranged on the actuator 6 or alternatively on the transmission 5. It is possible with the aid of the position detector 7 to ascertain a positioning movement and/or the position of the actuator 6. A position variable regarding the ascertained position of the actuator 6 is transmitted in an appropriate manner to the control device 3. For example, the position detector can comprise a GMR sensor (GMR: giant magneto-resistance), a Hall sensor or the like. Alternatively, visual methods can also be used. For example, a detector voltage can be provided as a position variable to the control device, which detector voltage digitizes the position variable for example with the aid of an analogue-digital converter prior to further processing.

Positioners 2 of this type can be used for example in motor vehicles, for example in the case of throttle valves, exhaust gas recirculation valves, charge motion control valves and numerous similar components. In particular, positioners 2 of this type can be used in situations where the correct positioning movement of the positioner 2 is essential for proper functioning and therefore the position detector 7 is in any case provided on the actuator 6 in order to check its position.

As the actuator 6 is adjusted, a counter force that is in the opposite direction to the positioning movement acts on said actuator as a result of the friction both in the transmission 5 and also in the servomotor and the actuator. Furthermore, the actuator 6 can be influenced by a restoring force depending upon the field of application, which restoring force acts upon the actuator 6 by way of a restoring spring 8, in particular by way of a pre-stressed restoring spring 8, so that the actuator 6 is moved into an idle position when the servomotor 4 is in the currentless state.

Figure 2:
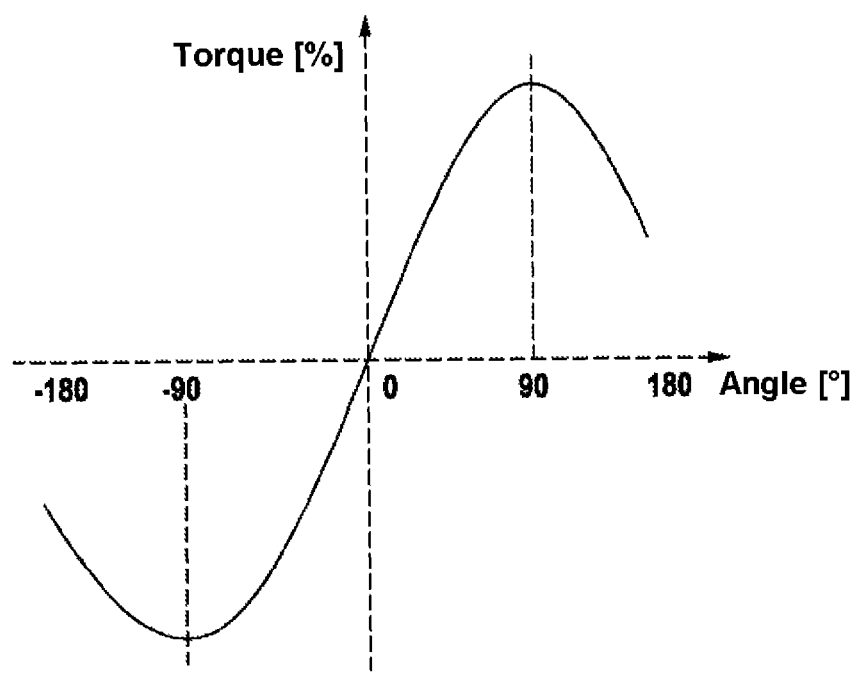
FIG. 2 is a diagram for illustrating the torque in dependence upon an angle difference between the motor magnetic field and the exciter magnetic field that is generated by the rotor at a constant motor current.

In order to be able to operate the electronically commutated servomotor 4, it is necessary to know the rotor position of a rotor 41 that is provided in the servomotor 4. The control process is generally performed by means of control signals and/or commutation signals that produce a stator magnetization that causes the generation of a motor magnetic field. The motor magnetic field interacts with the exciter magnetic field, which is generated by the rotor 41, and thus causes a drive torque to be generated. With respect to a specific motor current through the stator windings, the generated torque is dependent upon the angle between the direction of the motor magnetic field and the direction of the exciter magnetic field. With respect to a specific motor current, the maximum torque is achieved in the case of an advance angle of the motor magnetic field of 90° with respect to the stator magnetic field. The torque reduces with respect to the specific motor current in the case of deviations from this advance angle. FIG. 2 illustrates a graph of the torque in the case of a specific motor current plotted over the advance angle.

In the present positioner system 1, it is proposed to forego a rotor position sensor or a method for ascertaining the rotor position without the use of sensors and instead to use the position detector 7 that is fixedly coupled to the actuator 6 in order to ascertain the actual rotor position.

If the position detector 7 is required in a positioner system 1 in order to check the actual position of the actuator 6, it is possible to provide the brushless servomotor 4 without a rotor position sensor, as in its place it is possible to use the position of the position detector 7 in order to ascertain the rotor position from the position of the actuator 6. The actuator 6 is allocated to the rotor position of the rotor of the servomotor 4 taking into consideration the gear reduction and/or transfer ratio of the transmission 5 and/or of the mechanism. The allocation process is performed in the control device 3 with the aid of a pre-defined allocation function or a look-up table.

In one example, the electric motor of the servomotor 4 can be provided as a three-phase synchronous motor having two rotor pole pairs. The minimum resolution of the commutation then amounts to 30° of the mechanical rotor position. This also corresponds to the required resolution of the rotor position recognition. In the case of an assumed reduction gear ratio of the transmission 5 of 1:30, the resolution of the position detector 7 needs to be 1° in order for sufficient discrimination of the rotor position to occur.

During the commissioning of the positioner system 1, the position variable of the position detector 7 is not allocated to the actual rotor position of the rotor 41 of the servomotor 4. A calibration process is therefore provided that renders it possible to convert the position variables into actual rotor positions. In the case of conventional calibration processes for brushless electric motors, the travel distance is queried in the controlled operation and a corresponding allocation between a space phasor angle of an applied motor magnetic field and the associated position of the rotor 41 is recorded. This occurs under the assumption that the exciter magnetic field in the controlled operation is aligned directly in the direction of the motor magnetic field.

In practice, however, owing to the friction forces, for example of the transmission 5 or the actuator 6 or a restoring force, counter forces that cause a deviation of the direction of the motor magnetic field with respect to the direction of the exciter magnetic field in the control operation are created. It is also possible, as illustrated, for the actuator 6 to be influenced by the restoring spring 8 and this can cause a considerable deviation of the alignments of the exciter magnetic field and of the motor magnetic field.

In order to take into consideration the influence of these counter forces in the calibration process and to eliminate said influence, it is proposed to provide two different voltage amplitudes for a specific space phasor angle of the commutation pattern that is controlling the servomotor 4 and corresponds to a specific ratio of the phase voltages with respect to each other. As a result of the effective counter force, this results in different positions of the actuator 6, which leads to different position variables of the position detector 7.

Figure 3:
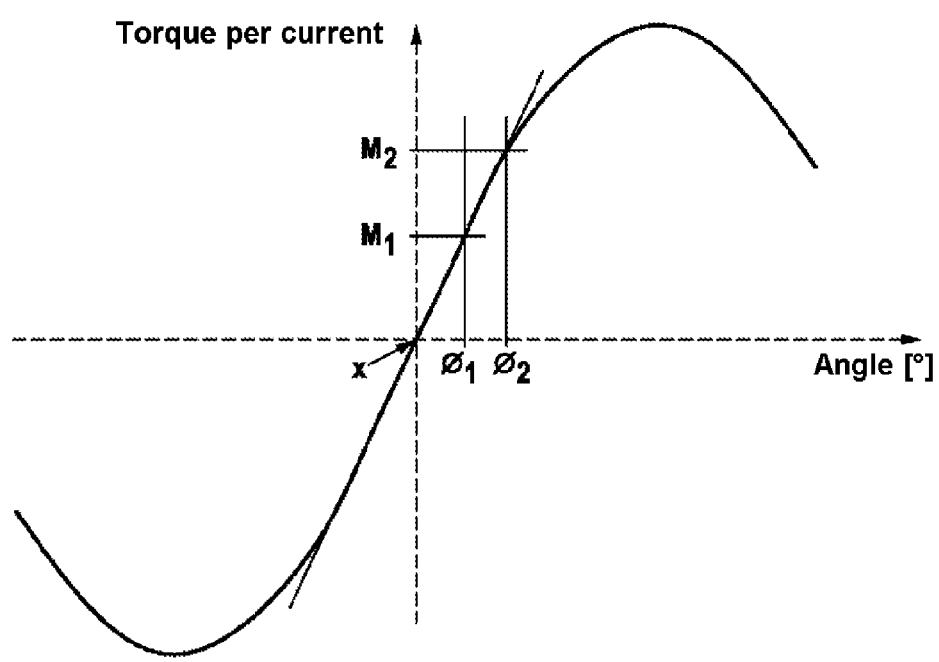
FIG. 3 is a diagram for illustrating the dependency of the torque per current unit over the offset angle between the motor magnetic field and the exciter magnetic field of the rotor, which torque is acting on the actuator.

As illustrated in FIG. 3, the linear part of the curve illustrated in FIG. 2 is used in order to ascertain the corresponding position variable $U_1$, $U_2$ from the two measuring points in the case of a specific position of the space phasor and/or of a specific direction of the motor magnetic field (in the case of different magnitudes of the magnetic field), for example in the form of a detector voltage that would be present in the absence of any restoring force in the positioner system 1, in other words when the actuator 6 is not being influenced by a counter force. This is possible since the progression of the torque in the case of a specific motor current in the region of an advance angle of 0° can be assumed essentially as linear. The following therefore applies:

$$M_1 \times I_1 = M_2 \times I_2,$$

$$M_1 \times TV_1 = M_2 \times TV_2,$$

wherein $M_1$, $M_2$ represent the torque per current unit and/or the torque per duty cycle. $I_1$, $I_2$ represent motor currents in the case of duty cycles $TV_1$ and/or $TV_2$.

The position variables $U_1$, $U_2$ are lower in the case of shorter duty cycles TV. The longer the duty cycle TV, the more capable the servomotor 4 is in counteracting the counter forces. The relationship between the variable of the difference angle $\Phi_1$, $\Phi_2$ and the measured detector voltages $U_1$, $U_2$ is used to calculate the compensated position variable $U_0$ in the case of a rotor position. The compensated position variable $U_0$ is extrapolated from the position variables $U_1$, $U_2$ that are measured in the case of different motor currents.

In the case of a conventional positioner system, it can be assumed that the torque per motor current unit and/or per duty cycle unit is proportional to the difference angle between the motor magnetic field and the exciter magnetic field. The following applies:

$$M_1 \sim \Phi_1, M_2 \sim \Phi_2.$$

From which it follows that:

$$\Phi_1 \times TV_1 = \Phi_2 \times TV_2.$$

Since the difference angle $\Phi_1$, $\Phi_2$ corresponds to the difference of the detector voltage between the respective measured detector voltage $U_1$, $U_2$ and the detector voltage $U_0$ that would prevail in the case of a positioner system 1 that is not provided with a restoring force, the following applies:

$$(U_1 - U_0) \times TV_1 = (U_2 - U_0) \times TV_2.$$

From which it follows that:

$$U_0 = (U_1 \times TV_1 - U_2 \times TV_2)/(TV_1 - TV_2).$$

In this manner, it is possible to allocate a position variable in the form of a detector voltage $U_0$ or the like to the currently applied motor magnetic field and/or to the direction of the currently applied motor magnetic field, as a consequence of which a rotor position that corresponds to the direction of the motor magnetic field is allocated to a position variable.

By virtue of using the space vector in order to generate the motor magnetic field for a period of time until the actuator has moved over the entire adjustment range, it is possible to allocate rotor positions to the position variables of the position detector 7 in the case of different motor magnetic field directions. The rotor positions are obtained in accordance with the above-mentioned method by means of extrapolation on a rotor position that would be obtained if the positioner system were not influenced by a counter force.

The invention claimed is:

1. A method for calibrating a positioner system including an electronically commutated servomotor and an actuator that is influenced by a counter force and is coupled to said servomotor, wherein a position of the actuator is detected in order to obtain a position variable, and wherein the servomotor is commutated in order to generate a motor magnetic field based on a rotor position that is ascertained with an aid of the position variable, said method comprising:
   controlling the servomotor so that a first motor magnetic field of a first magnitude is generated, and ascertaining a first position variable for the position of the actuator that is aligned with the first motor magnetic field;
   controlling the servomotor so that a second motor magnetic field of a second magnitude is generated, and ascertaining a second position variable for the position of the actuator that is aligned with the second motor magnetic field, wherein the directions of the first motor magnetic field and the second motor magnetic field are identical;
   based on the first position variable and the second position variable, ascertaining a position variable that indicates a position of the actuator under the assumption that the actuator is not influenced by a counter force; and
   allocating the ascertained position variable to a rotor position that corresponds to the direction of the first motor magnetic field and second motor magnetic field.

2. The method as claimed in claim 1, wherein the position variable that indicates a position of the actuator under the assumption that the actuator is not influenced by a counter force is ascertained for the position of the actuator for the actuator that is not influenced by a counter force by extrapolation of the first position variable and the second position variable.

3. The method as claimed in claim 2, wherein the extrapolation is performed at a point where the magnitude of the motor magnetic field corresponds to zero or almost zero.

4. The method as claimed in claim 2, wherein the position variable that indicates a position of the actuator under the assumption that the actuator is not influenced by a counter force is ascertained for the position of the actuator for the actuator that is not influenced by a counter force by linear extrapolation of the first position variable and the second position variable.

5. The method as claimed in claim 1, wherein the servomotor is configured to be controlled with the aid of phase voltages, wherein the magnitude of the motor magnetic field is ascertained by a duty cycle of phase voltages that are applied to the servomotor and/or wherein the direction of the motor magnetic field is ascertained by the ratio of the phase voltages.

6. The method as claimed in claim 1, wherein the direction of the first motor magnetic field and the second motor magnetic field is circular and wherein several allocations of the respective ascertained position variable are made to the rotor positions that correspond to the directions of the first motor magnetic field and the second motor magnetic field.

7. A device for calibrating a positioner system, including an electronically commutated servomotor and an actuator that is influenced by a counter force and is coupled to said servomotor, wherein a position of the actuator is detected in order to obtain a position variable, and wherein a commutation of the servomotor is performed in order to generate a motor magnetic field based on a rotor position that is ascertained with an aid of the position variable, the device being configured:
   to control the servomotor in such a manner that a first motor magnetic field of a first magnitude is generated, and to ascertain a first position variable for the position of the actuator that is aligned with the first motor magnetic field;
   to control the servomotor in such a manner that a second motor magnetic field of a second magnitude is generated, and to ascertain a second position variable for the position of the actuator that is aligned with the second motor magnetic field, wherein the directions of the first motor magnetic field and the second motor magnetic field are identical;
   based on the first position variable and the second position variable, to ascertain a position variable that indicates a position of the actuator under the assumption that the actuator is not influenced by a counter force; and to allocate the ascertained position variable to a rotor position that corresponds to the direction of the first and second motor magnetic field.

8. The device of claim 7, further comprising a computer program product that comprises a program code that causes the device to implement a method to calibrate the positioner system if it is implemented on a data processing unit.

9. A positioner system, comprising:

an electronically commutated servomotor;

an actuator that is influenced by a counter force and is coupled to the servomotor;

a position detector configured to detect a position of the actuator and to provide a position variable that indicates the position of the actuator;

a control device configured to implement a commutation of the servomotor in order to generate a motor magnetic field based on the rotor position that is ascertained with an aid of the position variable; and a device configured to calibrate the positioner system, wherein the device causes the control device:

to control the servomotor in such a manner that a first motor magnetic field of a first magnitude is generated, and to ascertain a first position variable for the position of the actuator that is aligned with the first motor magnetic field; and to control the servomotor in such a manner that a second motor magnetic field of a second magnitude is generated, and to ascertain a second position variable for the position of the actuator that is aligned with the second motor magnetic field, wherein the directions of the first motor magnetic field and the second motor magnetic field are identical; and wherein the device is configured:

based on the first position variable and the second position variable, to ascertain a position variable that indicates a position of the actuator under the assumption that the actuator is not influenced by a counter force; and to allocate the ascertained position variable to a rotor position that corresponds to the direction of the first motor magnetic field and second motor magnetic field.

* * * * *